Feb. 7, 1950 O. A. SHANN 2,496,642

SUBSCRIBER TELEPHONE SET DOUBLE CONNECTION SIGNAL

Filed Jan. 20, 1945

INVENTOR
O. A. SHANN
BY O. D. M. Guthe
ATTORNEY

Patented Feb. 7, 1950 2,496,642

UNITED STATES PATENT OFFICE 2,496,642

SUBSCRIBER TELEPHONE SET DOUBLE CONNECTION SIGNAL

Oscar A. Shann, Short Hills, N. J., assignor to Bell Telephone Laboratories, Incorporated, New York, N. Y., a corporation of New York Application January 20, 1945, Serial No. 573,735

9 Claims. (Cl. 179—81)

This invention relates to telephone systems and apparatus and particularly to improvements at subscriber's telephone stations.

An object is to facilitate the operative control by subscribers over telephone connections established through their telephone apparatus.

Heretofore subscriber's apparatus in telephone systems have been provided with various types of signals for illuminating the station apparatus to facilitate the dialing of a connection or for other purposes. In some instances a lamp was provided in the dial structure which was lighted on the seizure of the telephone by the subscriber to establish a connection for illuminating the dial legends by direct or reflected light beams. In some cases the light source was stationarily mounted at the side of the finger wheel on the dial structure to permit its beam to be directed through a prism or a reflecting surface on the dial legends or through the dial wheel itself when made from a translucent material.

It is in general in connection with such lighting means that the present invention is concerned with regard to one of its features. This feature consists of a lamp mounted on the dial wheel itself and a reflecting means also mounted directly on the dial wheel whereby light from the lamp is reflected onto the dial figures and circuit means including a plunger inside the cradle of the desk stand whereby when the handset is removed from the cradle and the plunger is lifted the lamp may be lighted.

Another feature is an arrangement for further controlling this lamp to act as a pilot signal for indicating to a subscriber at one station while his telephone is connected over his line to the central office, when the party at an extension station on the same line removes his handset from the cradle to listen in.

Thus this signal may serve the dual purpose of illuminating the dial wheel for dialing and for signaling at a master station when an extension station engages the same line.

The invention has been illustrated in the accompanying drawings in which—

Figures 1, 2, 3, 4:
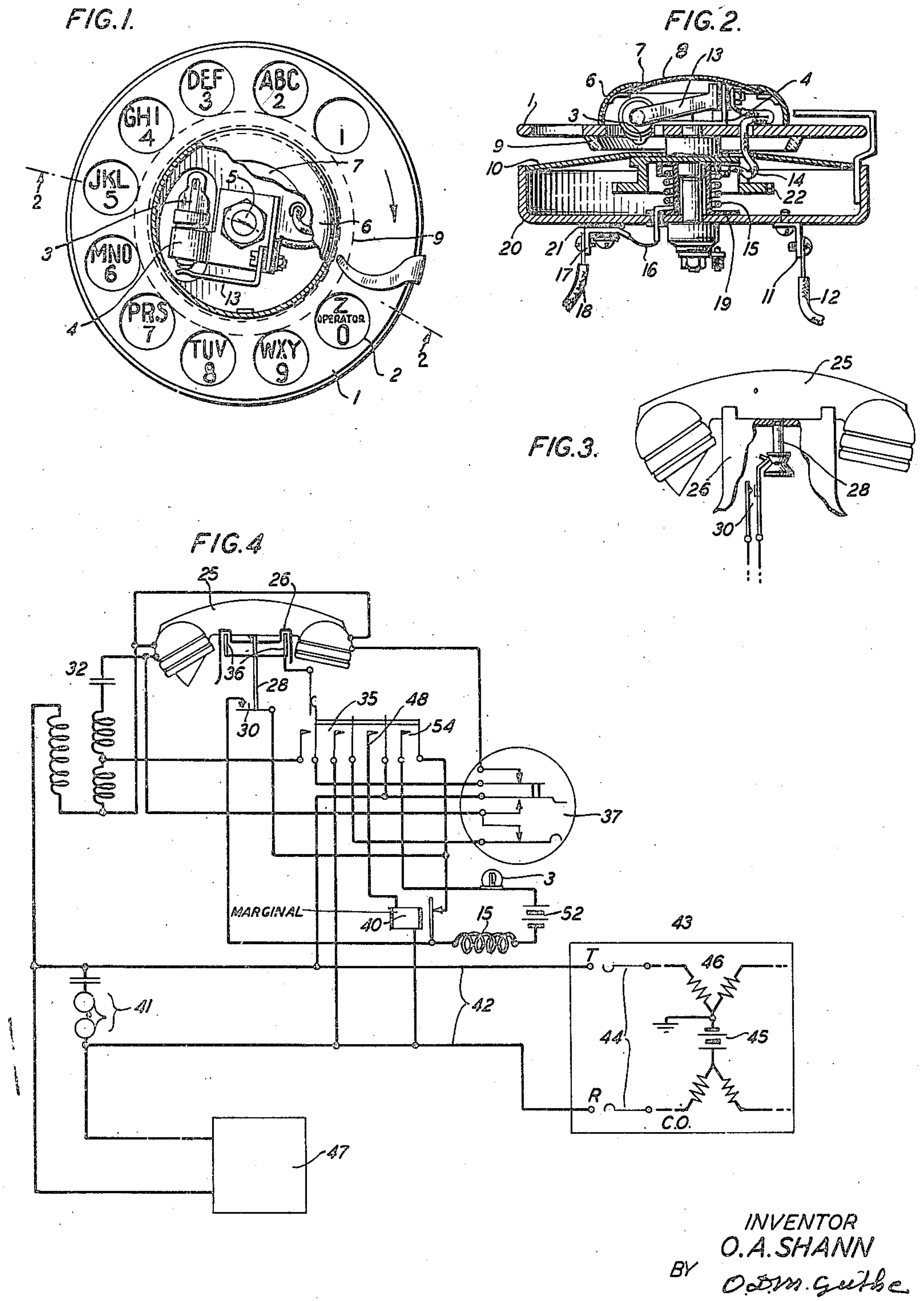
Fig. 1 shows a front view of a typical dial mechanism for establishing connections at the central office with the applicant's invention applied thereto.
Fig. 2 is a cross-section taken on line 2—2 of Fig. 1.
Fig. 3 shows a portion of a desk stand cradle and a typical handset resting therein with the applicant's invention applied thereto.
Fig. 4 shows a circuit diagram in accordance with the applicant's invention as applied to typical substation apparatus indicated diagrammatically.

Referring now to the drawings, Figs. 1 and 2, a finger wheel 1 is shown having the usual openings 2 through which the dial figures are visible. This figure also shows the mounting of the lamp 3 in a bracket 4 connected to the central movable shaft 5 on which the finger wheel is mounted. This lamp bracket may be covered by the usual number plate holder 6, so as to entirely cover the lamp and the bracket with the exception of a small opening or window 7 in the number plate 8 to permit light from the lamp 3 to shine out towards the front of the dial. The finger wheel 1 is provided on its under side with a translucent ring 9 through which light from the lamp 3 may be transmitted to the number plate 10. The bracket 4 in which the lamp is mounted provides one connection for the filament in the lamp which extends through the metal parts of the dial including the shaft 5 to an outside terminal 11 and a conductor 12, while the other connection for the filament is extended from the bottom of the lamp to a bracket 13 insulatedly connected to the mounting bracket 4. This bracket 13 is connected by a conductor 14 through the usual return spring 15 for returning the dial to normal and through another conductor 16 to a terminal 17 and a conductor 18 to the outside of the dial. The spring 15 is insulated from the dial by an insulating bushing 19 and the terminal 17 is insulated from the cover 10 by a washer 21. The inside mechanism of this dial has been merely indicated by a gear wheel 22, while the remaining elements of the dial structure, being well known, are omitted.

Fig. 3 shows a handset 25 mounted in a cradle 26 which has merely been shown fragmentarily as it forms part of any standard desk stand well known in the art. The difference between the standard desk stand required to carry out the applicant's invention is a plunger 28 mounted in the center of the cradle under the handset 25. This plunger when lifted by hand after the handset is removed from the cradle may be constructed so as to close a set of contacts 30, the purpose of which will be described hereinafter.

Fig. 4 shows a circuit diagram for the carrying out of the applicant's invention. It consists in general of the standard telephone equipment at a master station including the handset 25, an induction coil 32 and line switch contacts 35 controlled by the usual plungers 36 located in the cradle and associated lever mechanism which, when the handset is lifted from the cradle, operate the line switch contacts 35 and a series of other contacts added to carry out the applicant's invention. The usual contacts of the dial have been shown in diagrammatic form at 37. The lamp 3 mounted in the finger wheel has been shown and a special marginal relay 40 is provided for carrying out the applicant's invention. The usual ringer and condenser are shown at 41. This telephone circuit at the master station is connected to a pair of line conductors 42 leading to terminals in the central office 43 and terminate in the usual line finder 44, the brushes of which lead to a source of current 45 through the usual repeating coil 46. The circuit and equipment at the central office are shown merely in diagrammatic form. The line 42 also extends to an extension station 47 which has been indicated merely by a box.

The invention illustrated in these drawings operates as follows. If the subscriber at the master station lifts his handset 25 from the cradle 26, the line switch contacts 35 are operated to establish a connection to the central office 43 over the line 42 through the line finder 44 and from there in the usual manner to the source of current 45. As this connection is established, the relay 40 is operated from the source of current 45 over the line conductors 42 through the winding of this relay 40 and contacts 48 that are closed at this time. The operation of this relay 40 opens a circuit for the lamp 3 which would be closed on the lifting of the handset from the cradle from the local source of battery 52, that may be located in the desk stand for supplying current to this lamp. The lamp 3 will therefore not have time to light at this time. However, if the subscriber desires to illuminate the dial, he will lift the plunger 28, and close the connection through contacts 30 and thereby provide a lighting circuit for the lamp 3 from battery 52, the motor spring 15, contacts 30, contacts 54, lamp 3 back to battery 52. The light from the lamp 3 will light on the prism or translucent reflecting ring 9 and be reflected onto the dial legends imprinted on the plate 10 and thus illuminate these legends for the dialing of the connection by the subscriber. After dialing the subscriber may depress the plunger 28 to open the connection for the lamp and extinguish it. Now while the master station subscriber is engaged in conversation over the line 42, if the party at the extension station 47 lifts his handset from the desk stand, a circuit is completed through his telephone circuit in the usual manner and establishes a shunt across the line sufficient to permit the marginal relay 40 to release. The release of this relay now closes a connection for lamp 3 from battery 52, motor springs 15, contacts of relay 40, contact 54, lamp 3 back to battery 52. The light from this lamp now besides illuminating the dial figures also shines through the opening 8 in the number plate to indicate to the subscriber that the extension station subscriber has established a connection to this line. Thus in accordance with the applicant's invention the lamp 3 serves the dual purpose of illuminating the dial legends for dialing, and also indicates when an extension station establishes a connection to the line 42 over which the master station is connected to a central office.

What is claimed is:

1. In a telephone system, an individual subscriber telephone set at each of two stations connected through the same line to a central telephone switching station, a lamp and an electromagnetic switching control for said lamp, both at a particular one of said stations, for illuminating the station apparatus at said one station, said control automatically operative in response to the seizure of both stations as an indication that both of said stations have been seized, and a manual switching control for said lamp, at said one station, operative after said one station only is seized to light said lamp at said one station, to facilitate the operation of said one station.

2. In a telephone system, a line, a first and a second station on said line, a central telephone switching station connected to said line, a lamp and a manually operable switch control for said lamp, both at said first station, for illuminating the station apparatus at said first station, said switch operative at will after the seizure of said first station, an electromagnetic switch for said lamp at said first station, and joint cooperative switching controls for said switch at both of said stations, said switch operative through said controls after the seizure of said first station in case said first station is not illuminated for illuminating said first station on said seizure of the second station.

3. In a telephone system, a master station, an extension station, a central office, a source of current at said central office, line conductors connecting said central office with said stations, a lamp at said master station, a circuit including a source of current for lighting said lamp, a switch for closing said circuit to light said lamp, said switch manually operable at the master station, a relay at said master station for closing said circuit to light said lamp, said relay having joint cooperative switching controls at said master station and at said extension station, said relay operable in response to the connection of said source at the central office across said line conductors and to the actuation of said control at said extension station while said control at said master station is actuated.

4. In a telephone system, a master station, an extension station, a central office, a source of current at said central office, line conductors connecting said central office and said stations, a lamp at said master station, a circuit including a source of current for lighting said lamp, a relay at said master station connected across said line conductors when said master station is engaged, said relay energized when current from said source at the central office is applied across said line conductors and said master station is engaged, contacts controlled by said relay when energized for opening said circuit to prevent said lamp from lighting, and a control for said relay at said extension station, said control operative to deenergize said relay and light said lamp in response to the operable connection of said extension station to said line while said master station is operably connected to said line.

5. In a telephone system, a master station, an extension station, a central office, a source of current at said central office, line conductors connecting said central office to said stations, a lamp at said master station, joint cooperative switching controls at said master station and at said extension station, and an electromagnetic switch at said master station responsive to said controls, said controls and said switch operative to light said lamp only when said source at the central office is connected across said line conductors through both stations.

6. In a telephone system, a master station, an extension station, a central office and a source of current at said central office, line conductors connecting said central office to said stations, a lamp at said master station, a circuit for said lamp, a source of current and contacts in said circuit, a relay operative when energized for opening said contacts to prevent said lamp from lighting, said relay having marginal release characteristics and so associated with the line conductors, that when the line conductors are closed across the master station to the central office, sufficient current flows through said relay to energize it but when in addition the extension station is closed across the line conductors, said relay is released to close said contacts to light the lamp to indicate at the master station that the extension station is also connected across the line conductors.

7. In a telephone system, a master station, a telephone stand having a dial, a cradle and a handset resting in said cradle, an extension station, a central office, a source of current at said central office, line conductors connecting said central office with said two stations, a lamp at said master station for illuminating said dial, a set of contacts operative when the handset is removed from the cradle, two other sets of contacts, one set normally opened and the other normally closed, a circuit for said lamp including a source of current and said three sets of contacts, a plunger in said cradle manually operative after the handset is removed from the cradle for closing said normally opened contacts to light said lamp, a relay operative when energized for opening said normally closed contacts to prevent the lighting of said lamp after said handset is removed from the cradle, said relay being so adjusted magnetically that when the master station is connected across said conductors to the source of current at a central office, said relay will energize and when in addition the extension station is connected across said conductor, the relay will deenergize and thus cause the lamp to light to indicate at the master station that the extension station is also connected across the conductors.

8. In a telephone system, a master station, a telephone stand having a dial, a cradle and a handset resting in said cradle, an extension station, a central office, a source of current at said central office, a line connecting said central office with said stations, a lamp at said master station for illuminating said dial, a circuit for said lamp, a source of current and three sets of contacts in said circuit, means for closing one set of contacts when the handset is removed from the cradle, a plunger operative after the handset is removed from the cradle for closing another set of contacts to then light said lamp, a relay operative when the handset is removed from the cradle and current is applied from said source at the central office over said line, said relay in operating opening said third set of contacts for preventing said lamp from lighting provided said plunger has not been operated, said relay being so adjusted magnetically that when the handset is removed from the cradle and said plunger is not operated said relay will release when the extension station is connected to the line to permit said third set of contacts to close and the lamp to light as an indication to the master station that the extension station is also engaged on the line.

9. In a telephone system, a central office, a source of current at said central office, a master station, a desk stand thereat having a cradle and a handset in said cradle, a pair of contact springs in said stand, a plunger in said cradle manually operative after the handset is removed from the cradle for closing said contact springs, a dial mechanism in said stand having a finger wheel and an operating spring therefor which is electrically insulated from said dial mechanism, a lamp mounted on and movable with the finger wheel and having an electrical connection extending from the inside of the stand through said dial structure, said lamp and said insulated operating spring back to the inside of said stand, a light reflecting member attached to said finger wheel to reflect light from said lamp when lighted onto the dial figures of said dial mechanism, an extension station, line conductors connecting said central office to said stations, said electrical connection for the lamp including also a source of current and said contact springs for lighting said lamp when said contact springs are closed on the operation of said plunger, means for closing said electrical connection independent of said contact springs for lighting the lamp operable in response to the connection of said source at the central office across said line conductor and when both stations are connected across the line conductors and for preventing the closure of said electrical connection to prevent said lamp from lighting when said master station only is connected across said line conductors.

OSCAR A. SHANN.

REFERENCES CITED

The following references are of record in the file of this patent:

UNITED STATES PATENTS

| Number | Name | Date |
|---|---|---|
| 1,646,996 | Geale | Oct. 25, 1927 |
| 1,845,017 | Edwards | Feb. 16, 1932 |
| 1,897,106 | Bascom | Feb. 14, 1933 |
| 1,955,972 | Muse | Apr. 24, 1934 |
| 1,985,172 | Keller | Dec. 18, 1934 |
| 2,294,809 | Smith | Sept. 1, 1942 |